United States Patent Office 3,036,055
Patented May 22, 1962

3,036,055
PURIFICATION OF POLYOLEFINS
Richard H. Greenwell, Wilmington, Del., assignor to Hercules Powder Company, Wilmington, Del., a corporation of Delaware
No Drawing. Filed Nov. 1, 1956, Ser. No. 619,684
12 Claims. (Cl. 260—93.7)

This invention relates to the purification of polyolefins produced by low pressure processes and, more particularly, to the addition of a primary alcohol containing at least 4 carbon atoms to the reaction mixture at the end of the polymerization, in the low pressure polymerization of olefins, and then treating the reaction mixture with an aqueous alkaline solution whereby a polymer essentially free of catalyst residues is obtained.

K. Ziegler has described a new process of polymerizing ethylene and other 1-olefins under relatively mild conditions of temperature and pressure, the so-called low pressure process, by using as the catalyst for the polymerization a mixture of a compound of a metal of groups IV–B, V–B, VI–B or VIII of the periodic table or manganese, in combination with an organometallic compound of an alkali metal, alkaline earth metal, zinc, earth metal (especially aluminum), or rare earth metal. The process is usually carried out by mixing the two catalyst components in a hydrocarbon diluent and passing the ethylene or other olefin into the catalyst mixture at atmospheric or slightly elevated pressure and at room temperature or moderately elevated temperatures. When ethylene is so polymerized, a highly crystalline polyethylene is obtained that has many important industrial uses. In the process the polymer which is insoluble in the reaction medium precipitates out and is separated by any of the usual means such as filtration, centrifugation, etc. However, the polymer so produced contains large quantities of catalyst residues which detrimentally affect the color of the polymer, particularly when molded, and which also affect its electrical properties to such an extent that the use of the polymer for electrical insulation, etc., is prohibited. It has been suggested that these catalyst residues could be removed by treating the polymer with mineral acids, as for example, methanolic hydrochloric acid, aqueous solutions of nitric acid, etc. However, the polymer so treated still contains an appreciable amount of catalyst residue. Furthermore, the corrosion of apparatus that is encountered in the use of such acid treatments makes it impractical on a commercial scale.

Now, in accordance with this invention, it has been found that polymers produced by such catalytic polymerization processes and essentially free from such catalyst residues, or with such residues reduced to the point that color and electrical properties are not impaired, may be obtained if at the end of the polymerization reaction a primary alcohol containing at least 4 carbon atoms is added to the reaction mixture and the so-treated polymer slurry is then treated with an aqueous alkaline solution. Very surprisingly, it has been found that the catalyst residues are precipitated by this means in a form such that when the organic and aqueous phases are separated, as for example, by decantation, the catalyst residue precipitate remains suspended in the aqueous phase and the polymer, free of the catalyst residues, may then be isolated from the organic diluent. The polymer so purified is not only free from discoloration when subjected to molding and other plastic operations, but also the dielectric loss is greatly minimized so that the polymer may be used for electrical insulation.

This method of removing the catalyst residues may be applied to the polymer produced in the polymerization of any olefin with the Ziegler catalyst system or modifications thereof. Thus, any ethylenically unsaturated hydrocarbon or mixtures thereof may be polymerized and then purified by the process of this invention, as for example, hydrocarbons containing vinylidene, vinyl, or vinylene groups. The invention is of particular importance in the case of the polymerization of monoethylenically unsaturated hydrocarbons wherein the unsaturated group is a vinylidene group, which compounds have the general formula

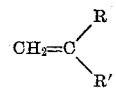

where R is alkyl and R' is alkyl, cycloalkyl, aralkyl, aryl, or alkaryl and those wherein the vinylidene group is a vinyl group, which compounds have the general formula $CH_2=CHR$ where R is hydrogen, a linear alkyl, a branched chain alkyl, cycloalkyl, aryl, aralkyl, or alkaryl, and for the polymerization of polyethylenically unsaturated hydrocarbons such as conjugated diolefins. Exemplary of the ethylenically unsaturated hydrocarbons which may be polymerized and then purified in accordance with this invention are the linear 1-olefins such as ethylene, propylene, butene-1, hexene-1, heptene-1, octene-1, octadecene-1, dodecene-1, etc., and branched chain 1-olefins and other olefins such as isobutylene, cis-butene, diisobutylene, tert-butylethylene, 4- and 5-methylheptenes-1, tetramethylethylene, and substituted derivatives thereof such as styrene, α-methylstyrene, vinylcyclohexane, diolefins such as hexadiene-1,4, 6-methylheptadiene-1,5 and conjugated diolefins such as butadiene, isoprene, pentadiene-1,3, cyclic olefins such as cyclopentadiene, cyclohexene, 4-vinylcyclohexene-1, β-pinene, etc.

In accordance with the process taught by Ziegler, the olefin is contacted at relatively low pressure and temperature with a catalyst prepared by mixing a compound of a metal of groups IV–B, V–B, VI–B or VIII of the periodic table or manganese with an organometallic compound of an alkali metal, alkaline earth metal, zinc or aluminum. The so-called transition metal compound may be an inorganic salt such as a halide, oxyhalide, etc., or an organic salt or complex such as an acetylacetonate, etc. Exemplary of the transistion metal compounds that may be used are titanium and zirconium tetrachlorides, manganous chloride, nickelous chloride, ferrous chloride, ferric chloride, tetrabutyl titanate, zirconium acetylacetonate, vanadium oxyacetylacetonate, chromium acetylacetonate, etc. The organometallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

Another method of carrying out the polymerization process is to use a two-component catalyst system. In one such system the insoluble precipitate which is formed by mixing the transition metal compound and the organometallic compound as described above is separated and then used in combination with an additional organometallic compound. The insoluble reaction product will be readily separated, if the reaction took place in an inert diluent, from the diluent and soluble reaction by-products by centrifuging, filtering, or any other desired means. In some cases it may be desirable to wash the insoluble reaction product with additional amounts of hydrocarbon diluent in order to completely remove all of the soluble by-products. This hydrocarbon-insoluble reaction product is then used in combination with any organometallic compound of a metal selected from the group of alkali metals, alkaline earth metals, zinc, earth metals, and rare earth metals, which compounds have already been exemplified above. This second catalyst component may be the same organometallic compound that was used in preparing the insoluble reaction product catalyst component or it may be a different organometallic compound. Of particular importance is the use of such a hydrocarbon-insoluble reaction product in combination with an aluminum trialkyl such as triethylaluminum, triisobutylaluminum, trioctylaluminum, etc.

In another two-component catalyst system, the whole reaction mixture formed on mixing a transition metal compound and an organometallic compound may be used in combination with an additional organometallic compound, if the latter is halogen-free. This two-component catalyst system is particularly useful for the polymerization of linear 1-olefins. Suitable halogen-free organometallic compounds that may be used as the second catalyst component in this system are alkali metal alkyls such as butyl-lithium, amylsodium, etc., dialkylmagnesium compounds such as dimethylmagnesium, diethylmagnesium, etc., alkylaluminum hydrides such as diisobutylaluminum hydride, etc., and trialkylaluminum such as trimethylaluminum, triethylaluminum, triisobutyl aluminum, trioctylaluminum, etc.

In all of these processes the removal of the catalyst residue from the polymer is of paramount importance and the process of this invention makes it possible to overcome this difficulty. Even in the case where a soluble catalyst system is employed and the polymer contains relatively small catalyst residues, the process of this invention may be applied and so further reduce the catalyst residue in the polymer. Such a soluble catalyst is that particularly adapted for the polymerization of ethylene wherein the olefin is contacted with a mixture of an organometallic compound of a transition metal, such as bis(cyclopentadienyl)titanium dichloride, and an alkali metal alkyl, alkaline earth metal alkyl, or an aluminum alkyl compound.

These polymerization processes are carried out in a wide variety of ways, as for example, as batch or continuous operation and with or without the use of an inert organic diluent as the reaction medium. Usually a diluent is preferred for carrying out the process. Any inert liquid organic solvent may be used as the diluent, as for example, aliphatic hydrocarbons such as hexane, heptane, isooctane, etc., cycloaliphatic hydrocarbons such as cyclohexane, aromatic hydrocarbons such as benzene, toluene, xylene, etc., or any mixture of such hydrocarbons, or halogenated aromatic hydrocarbons such as chlorobenzenes, chloronaphthalenes, etc. As pointed out already, the transition metal compound and the organometallic compound may be reacted in situ, as for example, in the particularly effective method of polymerizing diolefins wherein a trialkylaluminum is reacted in situ with a tetraalkyl titanate. They may also be reacted prior to the introduction of the olefin or they may be reacted and then used in combination with additional organometallic compound. They may also be added in increments during the polymerization and many other such variations may be utilized. Many other variations may be made in the polymerization system to which the purification process of this invention may be applied. For example, when lower molecular weight polymers are desired, a viscosity reducing agent such as a haloalkane, as for instance, carbon tetrachloride, etc., or hydrogen, or other such agent may be added.

The following examples will illustrate the process of purifying, in accordance with this invention, polyolefins produced by the low pressure processes. All parts and percentages are by weight unless otherwise indicated.

EXAMPLES 1–8

In each of these examples ethylene was polymerized by passing the ethylene into a mixture of liquid hydrocarbons as diluent (boiling point of about 200–240° C.) in contact with a two-component catalyst system at room temperature. The first catalyst component was the hydrocarbon insoluble reaction product obtained by mixing ethylaluminum sesquichloride with titanium tetrachloride in a hydrocarbon diluent, the amount of said catalyst component used in the polymerization being equivalent to about 10 millimoles of titanium tetrachloride per liter of diluent. This catalyst component was then used in combination with an additional quantity of ethylaluminum sesquichloride as the second catalyst component, the amount of the latter being added to the polymerization system depending upon the rate of the polymerization, etc., usually an amount of about 5–20 millimoles per liter of diluent. At the end of the polymerization reaction the polyethylene was in the form of a slurry (about 25% solids of polyethylene) in the hydrocarbon diluent. The polyethylene was in the form of fairly dense particles having an average diameter of about 100–300 microns. To the reaction mixture in each case was added n-butanol under an atmosphere of nitrogen and the reaction mixture was agitated. The reaction mixture was then neutralized by adding an aqueous solution of sodium hydroxide and the aqueous layer was decanted. In some cases the slurry was washed with water by decantation and, after separating the polymer from the organic liquid phase by filtration, the polymer was steam-distilled before drying. In other cases one or the other of these operations was omitted. The amount of n-butanol as percent by volume, temperature of the n-butanol treatment, concentration of the neutralizing liquor and temperature of the caustic treatment, water washes and steam distillation, together with the inorganic content of the polymer in each case are shown in Table I below.

Table I

| Ex. | n-Butanol treatment | | Aqueous caustic treatment | | | | Number of water washes | Steam distillation | Inorganic content of polymer | |
|---|---|---|---|---|---|---|---|---|---|---|
| | Percent added | Temp., °C. | Conc. of solution, percent | Volume added, percent of slurry | Temp., °C. | Number of caustic additions | | | Sulfate ash, percent | Chlorine, percent |
| 1a | 2 | 25 | 4 | 100 | 30 | 3 | 0 | Yes | 0.09 | 0.022 |
| 1b | 2 | 25 | 4 | 100 | 100 | 3 | 0 | Yes | 0.11 | 0.020 |
| 2a | 2 | 25 | 4 | 100 | 30 | 1 | 1 | No | 0.13 | 0.09 |
| 2b | 2 | 25 | 4 | 100 | 30 | 1 | 0 | Yes | 0.07 | 0.0344 |
| 3a | 0.5 | 25 | 4 | 100 | 30 | 1 | 2 | Yes | 0.25 | 0.023 |
| 3b | 1.0 | 25 | 4 | 100 | 30 | 1 | 2 | Yes | 0.22 | 0.018 |
| 3c | 2 | 25 | 4 | 100 | 30 | 1 | 2 | Yes | 0.20 | 0.018 |
| 3d | 4 | 25 | 4 | 100 | 30 | 1 | 2 | Yes | 0.20 | 0.029 |
| 3e | 2 | 25 | 0.5 | 100 | 30 | 1 | 2 | Yes | 0.21 | 0.023 |

Table I—Continued

| Ex. | n-Butanol treatment | | Aqueous caustic treatment | | | | Number of water washes | Steam distillation | Inorganic content of polymer | |
|---|---|---|---|---|---|---|---|---|---|---|
| | Percent added | Temp., °C. | Conc. of solution, percent | Volume added, percent of slurry | Temp., °C. | Number of caustic additions | | | Sulfate ash, percent | Chlorine, percent |
| 3f | 2 | 25 | 10.0 | 100 | 30 | 1 | 2 | Yes | 0.23 | 0.043 |
| 4a | 2 | 25 | 4 | 10 | 30 | 1 | 2 | Yes | 0.21 | 0.030 |
| 4b | 2 | 25 | 4 | 25 | 30 | 1 | 2 | Yes | 0.23 | 0.045 |
| 4c | 2 | 25 | 4 | 50 | 30 | 1 | 2 | Yes | 0.20 | 0.043 |
| 4d | 2 | 25 | 4 | 67 | 30 | 1 | 2 | Yes | 0.20 | 0.044 |
| 5a | 1 | 25 | 0.2 | 100 | 30 | 1 | 0 | Yes | 0.18 | 0.068 |
| 5b | 1 | 25 | 0.8 | 100 | 30 | 1 | 0 | Yes | 0.19 | 0.071 |
| 5c | 1 | 25 | 2.0 | 100 | 30 | 1 | 0 | Yes | 0.19 | 0.067 |
| 5d | 1 | 25 | 4.0 | 100 | 30 | 1 | 0 | Yes | 0.17 | 0.075 |
| 6a | 0.5 | 25 | ¹0.1 | 100 | 30 | 1 | 2 | Yes | 0.16 | 0.043 |
| 6b | 0.5 | 25 | 4.0 | 100 | 30 | 1 | 2 | Yes | 0.16 | 0.026 |
| 7a | 2 | 80 | 4 | 100 | 30 | 1 | 0 | Yes | 0.04 | 0.027 |
| 7b | 2 | 80 | 4 | 100 | 30 | 1 | 3 | Yes | 0.02 | |
| 8a | 1 | 75 | 4 | 30 | 25 | 1 | 0 | Yes | 0.06 | 0.009 |
| 8b | 2 | 75 | 4 | 30 | 25 | 1 | 0 | Yes | 0.03 | 0.008 |
| 8c | 4 | 75 | 4 | 30 | 25 | 1 | 0 | Yes | 0.03 | 0.007 |
| 8d | 2 | 75 | 4 | 30 | 25 | 1 | 0 | No | 0.06 | 0.015 |

¹ pH=8.

EXAMPLE 9

A polyethylene polymer slurry, prepared by the process described in Examples 1-8, was treated with 2% of its volume of n-butanol for 16 hours at 80° C. After cooling to 25° C., one-half of the slurry was then neutralized with an aqueous 4% sodium hydroxide solution (slurry to caustic solution ratio of 2:1) and the other half with an aqueous 4% triethanolamine solution (slurry to alakline solution ratio of 2:1). After agitating each for 30 minutes in an open vessel, the aqueous phase was decanted and the polymer was separated from the organic diluent by filtration and steam-distilled. The inorganic content of the two purified polymers was:

| Neutralizing agent | Percent sulfate ash | Percent chlorine |
|---|---|---|
| Triethanolamine | 0.05 | 0.010 |
| Sodium hydroxide | 0.06 | 0.012 |

EXAMPLE 10

A polyethylene polymer slurry, prepared by the process described in Examples 1-8, was treated with 2% by volume of n-butanol for 16 hours at 80° C., and after rapidly cooling to 25° C., an aqueous 4% sodium hydroxide solution (in an amount of 25% of the slurry volume) was added and the mixture was agitated for 30 minutes at 25° C., after which the aqueous phase was decanted. The polymer phase was divided into two portions. To one was added an aqueous 0.1% solution of sodium hydroxide and to the other an aqeous 4.0% solution of sodium hydroxide, both solutions also containing 0.1% AF-100 (an ethylene oxide adduct of nonylphenol), the ratio of slurry to caustic solution in each case being 2:1. These slurries were then steam-distilled for 4 hours. The inorganic content of the polymer after drying was:

| | Percent sulfate ash | Percent chlorine |
|---|---|---|
| 0.1% caustic | 0.06 | 0.015 |
| 4.0% caustic | 0.07 | 0.018 |

EXAMPLE 11

A polymerization vessel was charged with 500 parts of a mixture of liquid hydrocarbons boiling in the range of 200-240° C. and after displacing the air with nitrogen, 1.2 parts of titaniumtrichloride was added. With the temperature at 80° C., ethylene was passed in, the rate being controlled at 1.2 liters/min. by addition of a 0.1 M solution of diisobutylaluminum chloride (1.76 parts/liter required), and at the same time air, equal to 0.03% oxygen based on 1.2 liters/min. of ethylene, was also passed into the polymerization mixture. When the polymer slurry so produced became too thick for easy agitation, 12.5 parts of n-butanol (2% by volume) was added and agitation was continued for 30 minutes under nitrogen and at 75° C. After cooling to room temperature, 250 parts of an aqueous 4% sodium hydroxide solution was added and the mixture was agitated in an open vessel for 30 minutes. The aqueous phase was then decanted, the polymer slurry filtered and the polymer cake was steam-distilled in 2000 parts of water containing 0.1% sodium hydroxide and 0.1% of an ethylene oxide adduct of nonylphenol. The polymer was then washed with water until neutral and dried. It had a sulfate ash of 0.03% and a chlorine content of 0.010%.

EXAMPLES 12 and 13

Ethylene was polymerized by the process described for Examples 1-8. At the end of the polymerization, the polymer slurry in Example 12 was treated with 2% by volume of 2-ethylhexanol and in Example 13 with 2% by volume of n-amyl alcohol for 30 minutes at 75° C. under an atmosphere of nitrogen. To each, after cooling to room temperature, was then added an aqueous 4% sodium hydroxide solution in an amount equal to 25% by volume of the polymer slurry. After agitating for 30 minutes in an open vessel, the aqueous layer was decanted and the organic layer was filtered. The polymer cake was then steam-distilled and dried. The inorganic content of the two purified polymers was:

| | Alcohol used | Percent sulfate ash | Percent chlorine |
|---|---|---|---|
| Example 12 | 2-ethylhexanol | 0.05 | 0.011 |
| Example 13 | n-Amyl alcohol | 0.04 | 0.010 |

EXAMPLE 14

Ethylene was polymerized by passing it into a solution of bis(cyclopentadienyl)titanium dichloride in toluene (1.2 parts per liter) at 30° C. while adding diethylaluminum chloride (2.78 parts per liter) and adding oxygen at the rate of 0.13 part per liter per hour. The polymerization was stopped after 5 hours and n-butanol, 2% by volume of the slurry, was added and the mixture was agitated at 50° C. for 0.5 hour under nitrogen. After cooling to room temperature, 25% by volume of a 4% aqueous sodium hydroxide solution was added. This mixture was agitated in the open for 0.5 hour, the aqueous phase then decanted, and the polymer isolated from the organic phase by filtration. The polymer cake was steam-distilled and dried. The polymer so obtained and purified had a sulfate ash of 0.14%.

EXAMPLE 15

Propylene was polymerized by passing the gas under a constant pressure of 35 p.s.i.g. into a polymerization vessel containing 2000 parts of n-heptane, 3.5 parts of triethylaluminum, and the hydrocarbon insoluble reaction product obtained by mixing 3.8 parts of titanium tetrachloride with 5.1 parts of ethylaluminum dichloride in a hydrocarbon diluent. The polymerization was maintained at 50° C. and continued until the absorption of propylene had materially decreased. At this point the slurry of polypropylene in n-heptane had a solids content of 9.10%. It was drained from the polymerization vessel under nitrogen, quenched with 2% by volume of n-butanol, and the mixture was heated to 75-85° C. and agitated under nitrogen for 0.5 hour. After cooling it was neutralized by adding 25% by volume of a 4% solution of sodium hydroxide in water, agitated for 0.5 hour and then filtered on a sintered glass filter. The filter cake was steam distilled in 2000 parts of a 1% aqueous solution of sodium hydroxide containing 0.0375% of AF-100 (an ethylene oxide adduct of nonylphenol) until the polymer was free of heptane. The slurry was then filtered and the polymer cake was washed three times by slurrying on the filter with water, after which it was dried at 80° C. under vacuum. The polypropylene so obtained and purified had a sulfate ash of 0.05%.

As may be seen from the foregoing examples, the process of this invention makes it possible to produce a polyolefin by the low pressure process and essentially free from catalyst residues. Primary alcohols containing at least 4 carbon atoms are unique in their action in solubilizing these catalyst residues in such a manner that when an aqueous alkaline solution is added to neutralize the polymer slurry, the catalyst residues are precipitated in a form such that they remain in the aqueous phase and hence are readily separated from the polymer. Any primary alcohol containing at least 4 carbon atoms may be used in accordance with this invention. Exemplary of such alcohols are n-butanol, n-pentanol, 3-methyl-1-butanol, n-hexanol, 2-ethyl-1-hexanol, 1-nonanol, etc. The amount of the primary alcohol, such as n-butanol, added at the end of the polymerization may be varied widely and will depend chiefly upon the amount of catalyst used in the polymerization and other reaction conditions, but in general is from about 0.1% to about 10% of the volume of the polymer slurry, and preferably is from about 1% to about 5%. Much larger quantities may be used but are not believed to serve any useful purpose and hence are not usually desired for practical considerations. The alcohol treatment may be carried out at any desired or practical temperature, as may be seen from the above examples, but generally will be from about 0° C. to about 100° C., and preferably from about 25° C. to about 80° C. Only a short reaction time is required for the alcohol treatment, depending upon the temperature, catalyst, etc. In general, a period of from about 10 minutes to 30 minutes is adequate but may be any length of time that is practical, as for example, overnight, etc. Preferably the alcohol treatment is carried out in an inert atmosphere, i.e., in the absence of oxygen, water, etc., and hence an oxygen- and water-free atmosphere is used, as for example, nitrogen or other inert gas.

After the alcohol treatment, the polymer slurry is neutralized by mixing it with an aqueous alkaline solution. The latter may be an aqueous solution of any water-soluble alkaline reagent, as for example, an alkali metal hydroxide such as lithium, sodium, or potassium hydroxide, an alkanolamine such as triethanolamine, a quaternary ammonium hydroxide, etc. The concentration of the alkaline solution, volume of it added, etc., will obviously depend upon the acidity of the polymer slurry (type of catalyst and amount used in the polymerization), the alkaline agent being used for the neutralization, etc. In general, the concentration of the aqueous alkaline solution will be from about 0.1% to about 10% and preferably from about 0.5% to about 5%. While higher concentrations may be used, they are not as effective in removing the catalyst residues and hence are not desirable. The temperature at which the alkaline treatment is carried out may be varied over a wide range since it does not appreciably affect the results. Thus, while temperatures of from about 5° C. to about 100° C. may be used, room temperature is normally used. The neutralization may be carried out in air or in an oxygen-free atmosphere with about equivalent results.

After the neutralization treatment, the polymer may be separated from the liquid organic-aqueous phases by any desired means. A practical means of isolating the polymer is to decant the aqueous phase and then separate the polymer from the organic liquid by filtration, centrifugation, etc., or to decant the aqueous phase and then wash the slurry of polymer in the organic phase with water, usually again by decantation, and finally filtering off the polymer and subjecting it to steam distillation to remove the last traces of organic diluent. Inasmuch as the catalyst residues are transferred rapidly to the aqueous phase in the neutralization treatment, a very clean separation is obtained and the number of washes applied does not have any large effect upon the purity of the polymer. In some cases the polymer may be directly separated by filtration, centrifugation, etc., without decantation of the aqueous layer. In this case, the separation operation is desirably carried out promptly after the neutralization of the slurry is complete to avoid agglomeration, etc., of the catalyst residues in the aqueous phase. After separation of the polymer by decantation, or other means, the polymer may be steam distilled for maximum purity. In carrying out the steam distillation it is generally preferable for practical considerations to have the mixture on the slightly alkaline side. Wetting agents may also be added in carrying out the steam distillation operation, as for example, the ethylene oxide adduct of nonylphenol, various anionic detergents, etc. Many other variations may obviously be made in the process of this invention.

What I claim and desire to protect by Letters Patent is:

1. In the process of polymerizing an ethylenically unsaturated hydrocarbon in an inert liquid organic diluent with a catalyst comprising a compound of a metal selected from the group consisting of the metals of groups IV-B, V-B, VI-B and VIII of the periodic table and manganese and an organometallic compound of a metal selected from the group consisting of alkali metals, alkaline earth metals, zinc, and earth metals, the step of removing the catalyst residues from the polymer which comprises adding to the polymerization reaction mixture containing the polymer a primary alcohol containing at least 4 carbon atoms, mixing the alcohol containing polymer slurry with an aqueous solution of a water-soluble alkaline reagent, and separating the solid polymer from the resulting aqueous and organic liquid phases.

2. The process of claim 1 wherein the said primary alcohol is added to the polymerization reaction mixture in an inert atmosphere.

3. The process of claim 2 wherein the primary alcohol that is added to the polymerization reaction mixture is n-butanol.

4. The process of claim 3 wherein the ethylenically unsaturated hydrocarbon that is polymerized is ethylene.

5. The process of claim 4 wherein the n-butanol treatment is carried out at a temperature of from about 25° C. to about 80° C.

6. The process of claim 5 wherein the aqueous solution of a water-soluble alkaline reagent is an aqueous solution of an alkali metal hydroxide.

7. The process of claim 6 wherein the polymer is isolated by decanting the aqueous phase from the organic slurry and then separating the polymer from the organic liquid phase.

8. The process of claim 6 wherein the polymer is isolated by filtration of the mixture of aqueous and organic phases obtained after the neutralization treatment.

9. The process of claim 7 wherein the polymer after isolation is further subjected to steam distillation.

10. The process of claim 8 wherein the polymer after isolation is further subjected to steam distillation.

11. In the process of polymerizing an ethylenically unsaturated hydrocarbon in an inert liquid organic diluent with a catalyst comprising a compound of a metal selected from group consisting of the metals of groups IV–B, V–B, VI–B and VIII of the Periodic Table and manganese and an organometallic compound of a metal selected from the group consisting of alkali metals, alkaline earth metals, zinc, and earth metals, the step of removing catalyst residues from the polymer which comprises adding butanol to the polymerization reaction mixture containing the polymer, heating the mixture to a temperature of 40–80° C., mixing the alcohol containing polymer slurry with an aqueous solution of a water-soluble alkaline reagent, and separating the solid polymer from the resulting aqueous and organic liquid phases.

12. The process of claim 1 wherein the ethylenically unsaturated hydrocarbon is propylene.

References Cited in the file of this patent

UNITED STATES PATENTS

| | | |
|---|---|---|
| 2,101,558 | Nealon | Dec. 7, 1937 |
| 2,827,447 | Nowlin et al. | May 18, 1958 |
| 2,838,477 | Roelen et al. | June 10, 1958 |
| 2,867,612 | Pieper et al. | Jan. 6, 1959 |
| 2,872,439 | Gresham et al. | Feb. 3, 1959 |
| 2,874,153 | Bowman et al. | Feb. 17, 1959 |

FOREIGN PATENTS

| | | |
|---|---|---|
| 533,362 | Belgium | May 16, 1955 |

UNITED STATES PATENT OFFICE
CERTIFICATE OF CORRECTION

Patent No. 3,036,055                        May 22, 1962

Richard H. Greenwell

It is hereby certified that error appears in the above numbered patent requiring correction and that the said Letters Patent should read as corrected below.

Columns 3 and 4, Table I, column 11, line 3 thereof, for "0.09" read -- 0.094 --; same Table I, column 11, line 4 thereof, for "0.0344" read -- 0.034 --.

Signed and sealed this 4th day of September 1962.

(SEAL)
Attest:

ERNEST W. SWIDER
Attesting Officer

DAVID L. LADD
Commissioner of Patents